Patented Sept. 25, 1934

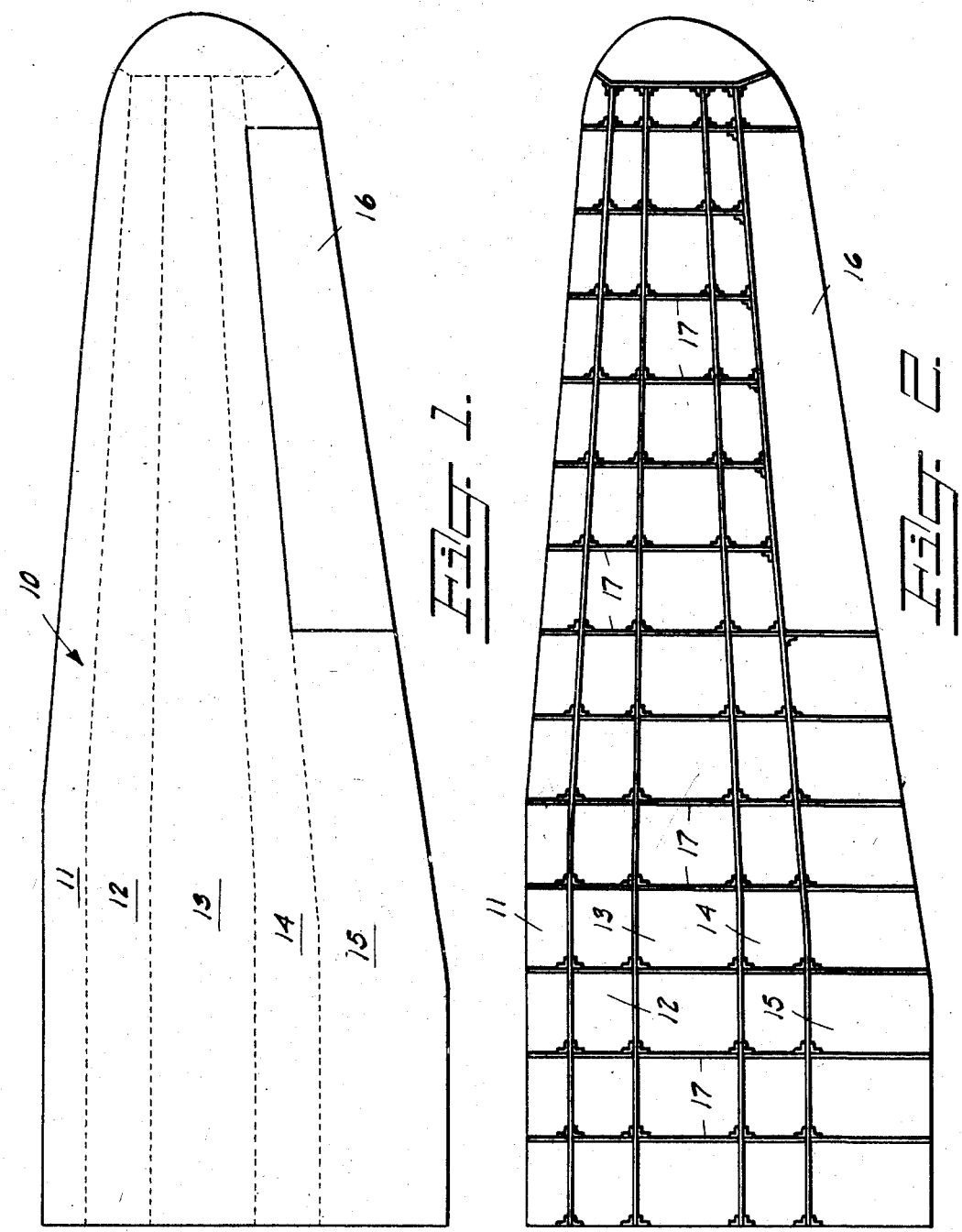

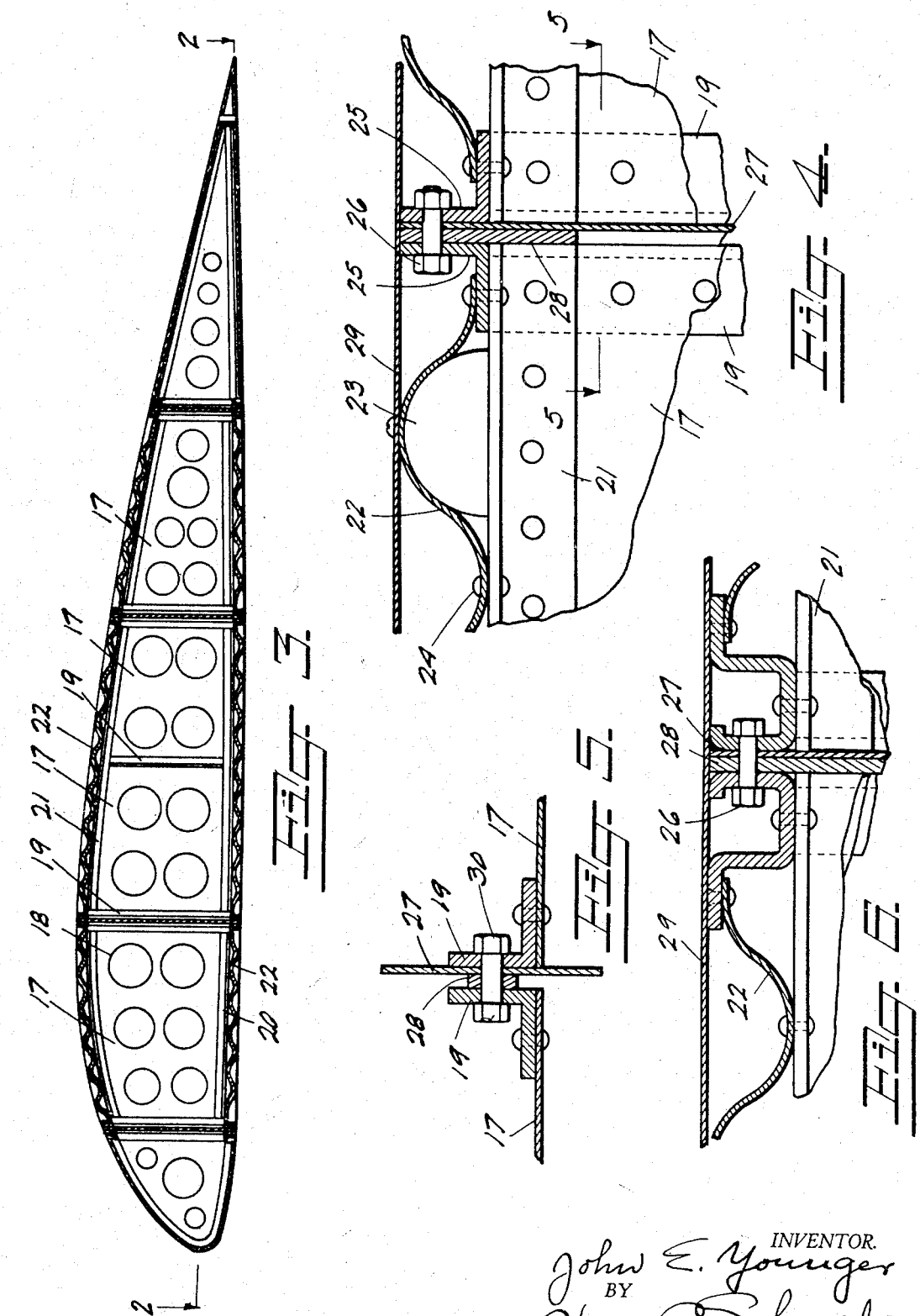

1,974,764

UNITED STATES PATENT OFFICE 1,974,764

AIRPLANE WING STRUCTURE

John E. Younger, Berkeley, Calif., assignor to Capelis Safety Airplane Corporation, Limited, Oakland, Calif., a corporation of California Application July 29, 1932, Serial No. 625,744

1 Claim. (Cl. 244—31)

This invention is an airplane wing structure and has special reference to a sectional wing for airplanes in which damaged sections may be removed and replaced as occasion may require.

Airplane wings as are at present constructed require the replacement of the entire wing in the event of damage to any portion, while in my invention the damaged portion can be replaced by a new section thus materially cutting down the cost of replacements, and coincidently forming a very rigid structure.

The main object of the invention is to provide an airplane wing which is composed of a plurality of longitudinal sections which are assembled together to form a unit and which may be opened for inspection and detection of damage or corrosion, and conveniently repaired.

Another object of the invention is to provide these various sections with means whereby they may be assembled and removed by means of ordinary tools such as screw drivers and wrenches, thereby permitting replacements and inspections at points remote from machine equipment.

Other objects and advantages of the invention will become apparent as the following description is read on the drawings forming a part of this specification and in which similar reference characters are used to indicate similar parts throughout the several views, of which:

Fig. 1 is a top plan view of my invention, the divisions between the separate sections being indicated by dotted lines.

Fig. 2 is a section taken on line 2—2 of Fig. 3.

Fig. 3 is an enlarged transverse sectional elevation through the wing structure.

Fig. 4 is a fragmentary enlarged detailed view of the connection between adjacent sections.

Fig. 5 is a section taken on line 5—5 of Fig. 4.

Fig. 6 is a modification of the means of connecting the various sections.

The invention consists primarily of the wing 10 which is divided longitudinally into a plurality of sections 11, 12, 13, 14 and 15, and connected by joints similar in principle to those illustrated in Figs. 4 or 6, the wing being provided with the usual ailerons 16, the entire structure being covered with the usual surfacing material after assembly.

Each section is provided with transverse webs 17 which are suitably lightened as indicated at 18 by forming holes through these webs. Each web 17 has angles 19 preferably riveted to each side edge and similar angles 20 and 21 riveted to the top and bottom edges.

Suitably secured to the outstanding leg of angles 20 and 21 is a sheet of corrugated metal 22 which is additionally supported by means of semi-cylindrical blocks 23 acting as fillers between the angle 21 and the projecting corrugation, the corrugated metal being indicated as riveted as shown at 24.

Extending lengthwise of each section adjacent the top and bottom edges are angles 25 which are suitably secured to the angles 21, and to which the edge of the corrugated metal is secured as shown. Holes are provided in the upstanding leg of the angle 25 to receive the bolts 26, these upstanding legs being equal in height to the corrugations formed in the corrugated plate 22.

This structure provides a plurality of webs 17 tied together lengthwise by means of angles 25 at each corner, and also being tied together by means of the corrugated metal 22 on both top and bottom.

To complete the assembly, single flat plates 27 extend the full length of the wing structure between the sections and are equal in width to the distance over the outer edges of the top and bottom angles 25, aligning apertures being provided for the bolts 26. Filler pieces 28 are provided to add shear strength at the bolt connections and to provide a wider face at the top for supporting the fabric or surface material 29, this surface material completely enveloping the wing structure and being secured by means of suitable screws to the corrugated metal as shown. Additional bolts are used to bolt the longitudinal web 27 between the angles 19 as shown in Fig. 5.

A modification of the fastening means is indicated in Fig. 6 in which rolled sections are used forming a pocket in which the top and bottom bolts are housed, this structure forming a more rigid connection than the angles indicated in Fig. 4, other features of the structure remaining the same throughout.

It will be noted that this wing structure may have any section replaced as may be required, as each of the individual sections 11 to 15 may be removed and replaced by a new section by merely removing the surface 29 and then removing the bolts 26 and 30 and replacing the section, and then replacing the surface material.

Having described an operative method and means of constructing a sectional wing structure it will be understood that variations which are consistend with the appended claims may be resorted to without detracting from the spirit or scope of the invention or sacrificing any of the advantages thereof.

I claim:

In an airplane wing-structure, a plurality of detachable longitudinal sections, a plurality of spaced transverse webs in each said section, the webs of the several sections being aligned transversely of the wing, angle-members about the sides of each said web, angle-bars fixedly secured along the lateral edges of said sections and arranged to be detachably connected with the adjacent section, vertically disposed plates extending longitudinally between said sections and extending to the outer edges of said angle-bars to be clamped therebetween, corrugated metal sheets secured along their edges to said angle-bars and intermediately to said angle-members, and a surfacing sheet enveloping the entire wing-structure secured to said corrugated metal.

JOHN E. YOUNGER.